United States Patent
Chen et al.

(10) Patent No.: US 9,565,654 B2
(45) Date of Patent: Feb. 7, 2017

(54) METHOD AND APPARATUS FOR INTERACTION WITH NOTIFICATION

(71) Applicant: Acer Incorporated, New Taipei (TW)

(72) Inventors: Pei-Lin Chen, New Taipei (TW); Yi-Wen Liu, New Taipei (TW); Ting-Feng Chou, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/801,849

(22) Filed: Jul. 17, 2015

(65) Prior Publication Data

US 2016/0353409 A1 Dec. 1, 2016

(30) Foreign Application Priority Data

May 25, 2015 (TW) .............................. 104116636 A

(51) Int. Cl.
*H04B 1/38* (2015.01)
*H04W 68/02* (2009.01)
*H04M 1/725* (2006.01)

(52) U.S. Cl.
CPC ......... *H04W 68/02* (2013.01); *H04M 1/72525* (2013.01); *H04M 1/72527* (2013.01); *H04M 1/72561* (2013.01)

(58) Field of Classification Search
CPC .............. H04W 68/02; H04M 1/72561; H04M 1/72527; H04M 1/72525
USPC ..................... 455/566, 434, 418, 417, 404.2, 414.1,455/405, 556.1, 68, 416, 435.1, 466; 340/425.5, 340/5.72, 5.62
See application file for complete search history.

(56) References Cited

U.S. PATENT DOCUMENTS

| | | | |
|---|---|---|---|
| 2010/0261508 A1* | 10/2010 | Chang .................. | G06F 3/1454 455/566 |
| 2015/0172435 A1* | 6/2015 | Choi ................... | H04M 1/7253 455/418 |
| 2015/0378665 A1* | 12/2015 | Han ...................... | G06F 3/1462 345/2.2 |

FOREIGN PATENT DOCUMENTS

EP 2242240 10/2010

* cited by examiner

*Primary Examiner* — Dhaval Patel
(74) *Attorney, Agent, or Firm* — Jianq Chyun IP Office

(57) ABSTRACT

A method and an apparatus for interacting with a notification are provided. The method is adapted for an end apparatus to interact with a notification provided by a communication apparatus, in which the end apparatus and the communication apparatus are connected with each other. In the method, the notification provided by the communication apparatus is received and displayed. Next, a selection operation for the notification is received, and whether a content of the notification contains an executable intent is determined. If the intent is contained, the communication apparatus is triggered to execute the intent, and whether a screen activity of the communication apparatus is triggered by the execution of the intent is determined. If the execution of the intent triggers the screen activity, a result of executing the intent is displayed.

6 Claims, 5 Drawing Sheets

METHOD AND APPARATUS FOR INTERACTION WITH NOTIFICATION

CROSS-REFERENCE TO RELATED APPLICATION

This application claims the priority benefit of Taiwan application serial no. 104116636, filed on May 25, 2015. The entirety of the above-mentioned patent application is hereby incorporated by reference herein and made a part of this specification.

BACKGROUND OF THE INVENTION

Field of the Invention

The invention relates to a method and an apparatus for notification, and more particularly to a method and an apparatus for interacting with a notification.

Description of Related Art

Currently, there are a large number of application programs available on the market that are capable of transmitting notifications of a communication apparatus such as mobile phone, tablet PC or the like to a computer, and the notifications are then received by a plugin in an operating system, a browser or a corresponding application program and displayed on the computer so as to catch a user's attention. Some of these programs only support one-way transmission of the notifications from the communication apparatus to the computer; some allow the user to perform specific operations on the computer, even allowing the user to operate the communication apparatus to execute operations.

The notifications provided by the communication apparatus not only have basic prompting functions. Some notifications also include executable intents for the user of the communication apparatus to respond to the notifications, such as answering a phone call or replying a message. However, when these operations are handed over to the computer, due to differences in operating systems, problems such as the operations being not supported or the execution results being not synchronized may occur. As a result, after the users respond to the notifications on the computer, they are usually unable to know the consequences of their operations, or they may receive too many unwanted notifications and feel disturbed.

SUMMARY OF THE INVENTION

The invention provides a method and an apparatus for interacting with a notification, by which a user may use an end apparatus to interact with a notification of a communication apparatus and obtain a result of the interaction.

The method for interacting with a notification according to the invention is adapted for an end apparatus to interact with a notification provided by a communication apparatus, wherein the end apparatus and the communication apparatus are connected with each other. In the method, the notification provided by the communication apparatus is received and displayed. Then, a selection operation for the notification is received, and whether a content of the notification contains an executable intent is determined. If the intent is contained, the communication apparatus is triggered to execute the intent, and whether a screen activity of the communication apparatus is triggered by the execution of the intent is determined. If the execution of the intent triggers the screen activity, a result of executing the intent is displayed.

The apparatus for interacting with a notification according to the invention includes a communication unit, a display unit, an input unit, a storage unit and a processing unit. The communication unit is configured to connect to the communication apparatus. The input unit is configured to receive an input operation. The storage unit is configured to store a plurality of modules. The processing unit is coupled to the communication unit, the display unit, the input unit and the storage unit, and is configured to access and execute the modules stored in the storage unit. The modules include a notification display module, an intent determination module, an activity determination module and an execution module. The notification display module receives a notification provided by the communication apparatus through the communication unit and displays the notification on the display unit. The intent determination module determines whether a content of the notification contains an executable intent. The activity determination module determines whether the execution of the intent triggers a screen activity of the communication apparatus. The execution module interacts with the notification when the input unit receives a selection operation for the notification, wherein if the content of the notification contains the executable intent, the execution module triggers the communication apparatus to execute the intent; and if the execution of the intent triggers the screen activity, the execution module displays a result of executing the intent on the display unit.

Based on the above, the method and the apparatus for interacting with a notification according to the invention determine whether the content of the notification contains the executable intent and determine whether the execution of the intent triggers the screen activity of the communication apparatus, thereby only displaying the result of execution of the intent that triggers the screen activity. By only displaying necessary execution results in the end apparatus, the user is prevented from receiving too many unwanted notifications.

To make the above features and advantages of the invention more comprehensible, embodiments accompanied with drawings are described in detail as follows.

DETAILED DESCRIPTION OF DISCLOSED EMBODIMENTS

The invention extends a user's experience of processing a notification on a communication apparatus to a home computer, which enables the user to respond to the notification by using the computer rather than the communication apparatus at home or other environment equipped with computers. With respect to a notification that contains an executable intent, the invention activates an application program in an end apparatus to execute the intent and display a result of the execution, or directly activates a screen mirroring so as to display a result of executing the intent by the communication apparatus. Accordingly, the user may not only quickly interact with the notification of the communication apparatus through the end apparatus, but may also see the selected results of the interaction on the end apparatus.

Figure 1:
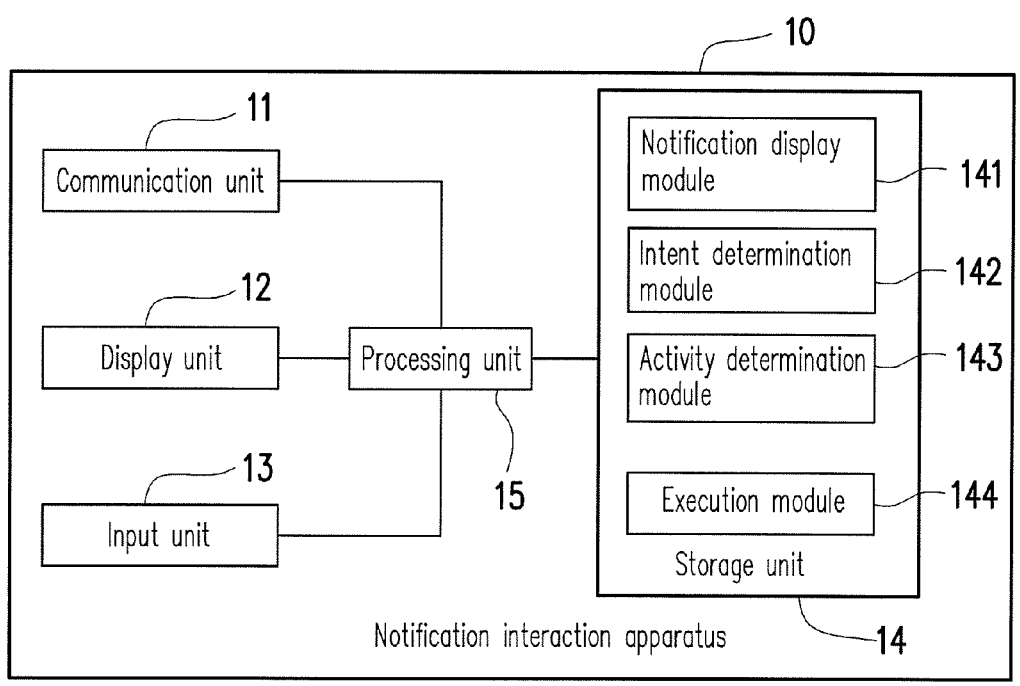
FIG. 1 is a block diagram illustrating an apparatus for interacting with a notification according to an embodiment of the invention.

FIG. 1 is a block diagram illustrating an apparatus for interacting with a notification according to an embodiment of the invention. Referring to FIG. 1, a notification interaction apparatus 10 according to the present embodiment is, for example, an end apparatus such as a desktop computer, a notebook computer, a vehicle computer or the like, and includes a communication unit 11, a display unit 12, an input unit 13, a storage unit 14 and a processing unit 15. Their functions are as follows.

The communication unit 11 supports signal receipt and transmission through, for example, the Global System for Mobile Communication (GSM) system, the Personal Handy-phone System (PHS), the Code Division Multiple Access (CDMA) system, the Wireless Fidelity (Wi-Fi) system, and the Worldwide Interoperability for Microwave Access (WiMAX) system, and is capable of connecting to an external communication apparatus for data transmission.

The display unit 12 is, for example, a liquid-crystal display (LCD), a light-emitting diode (LED) display, a field emission display (FED) or any other display. The input unit 13 is, for example, an input device such as a mouse, a keyboard, a joystick, a touch pad or the like, and configured to receive a user operation. The input unit 13 may also be a touch sensing device of a resistance type, a capacitor type or any other type, and may be integrated with the display unit 12 to form a touch screen.

The storage unit 14 may be any type of fixed or portable random access memory (RAM), read-only memory (ROM), flash memory or a similar device, or a combination of the above devices. In the present embodiment, the storage unit 14 is configured to record a notification display module 141, an intent determination module 142, an activity determination module 143 and an execution module 144. These modules are, for example, programs stored in the storage unit 14, and are capable of being loaded by the processing unit 15 of the notification interaction apparatus 10 for executing the function of interacting with notifications.

The processing unit 15 is coupled to the communication unit 11, the display unit 12, the input unit 13 and the storage unit 14, and is, for example, a central processing unit (CPU), or a programmable general purpose or special purpose microprocessor, a digital signal processor (DSP), a programmable controller, an application specific integrated circuit (ASIC) or other similar device or a combination of the above devices. In the present embodiment, the processing unit 15 is configured to access and execute the modules recorded in the storage unit 14, thereby realizing a method for interacting with a notification according to the invention.

Figure 2:
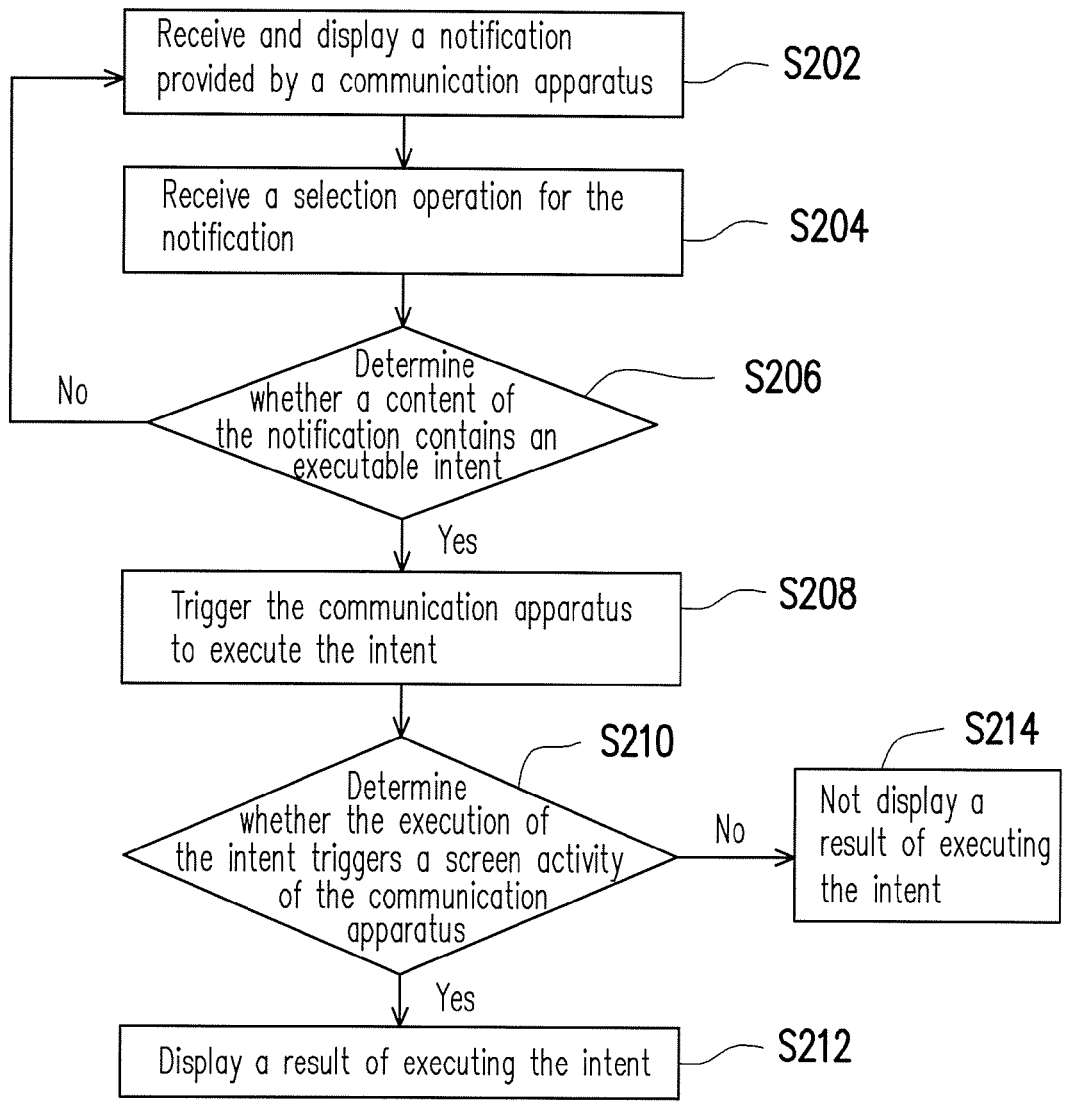
FIG. 2 is a flowchart illustrating a method for interacting with a notification according to an embodiment of the invention.

FIG. 2 is a flowchart illustrating a method for interacting with a notification according to an embodiment of the invention. Referring to FIG. 2, the method according to the present embodiment is adapted for the notification interaction apparatus 10 in FIG. 1. In the following, detailed steps of the method are explained with reference to the elements in the notification interaction apparatus 10.

First, the notification display module 141 receives a notification provided by an external communication apparatus through the communication unit 11 (not illustrated), and displays the received notification on the display unit 12 (step S202). The notification display module 141 is, for example, a plugin or an application program in an operating system or a browser built in the notification interaction apparatus 10. When the communication apparatus receives or generates a notification, the notification is received by the communication unit 11 and displayed on the display unit 12 simultaneously.

Next, the input unit 13 receives a selection operation of the user for the notification (step S204). At this moment, the intent determination module 142 determines whether a content of the notification received by the communication unit 11 contains an executable intent (step S206). In one embodiment, the determination of whether an executable intent is contained is completed at the communication apparatus end. Then, the communication apparatus notifies the intent determination module 142 of the notification interaction apparatus 10 of a result of the determination. In another embodiment, the determination of whether an executable intent is contained may be completed at the notification interaction apparatus 10, and then the intent determination module 142 determines by itself whether an executable intent is contained according to the content of the notification. The executable intent includes, for example, saving, downloading, or to forwarding a file associated with the notification, or any other function associated with the content of the notification. No limitation is imposed herein.

If the intent determination module 142 determines that the content of the notification contains no executable intent, it means that the notification is merely an info illation prompt not related to any execution of action. Thereupon, the process will go back to step S202 in which the notification display module 141 continues to receive and display a next notification. On the other hand, if the intent determination module 142 determines that the content of the notification contains an executable intent, it means that the notification not only provides information but initiates a specific action when the user makes a selection. At this moment, the execution module 144 triggers the communication apparatus to execute the intent (step S208).

Then, the activity determination module 143 determines whether the execution of the intent triggers a screen activity of the communication apparatus (step S210). The above screen activity indicates a change in the screen frame. In the present embodiment, whether to present a result of executing the intent on the notification interaction apparatus 10 is determined according to whether the screen frame is changed after the communication apparatus executes the intent. In this way, how the communication apparatus processes the notification is accurately reflected, and unnecessary display of notifications is avoided.

If the activity determination module 143 determines that the execution of the intent triggers the screen activity of the communication apparatus, the execution module 144 displays the result of executing the intent on the display unit 12 (step S212). Otherwise, the execution module 144 does not display the result of executing the intent on the display unit 12 (step S214). For example, if the intent contained in the notification is to download a file, when the user selects the notification, the communication apparatus, for example, displays a download status of the file on its screen. At the same time, the execution module 144 also displays the download status on the display unit 12. On the other hand, if the intent contained in the notification is to archive an e-mail, when the user selects the notification, the communication apparatus, for example, archives the e-mail corresponding to the notification, but does not display the process or result of the archive on its screen. At this moment, the execution module 144 does not display the result of executing the intent on the display unit 12.

By the above method, the present embodiment notifies the user of the notification interaction apparatus 10 of the result of executing the intent in the simplest way, and avoids generating too many unnecessary notifications.

It is noted that when displaying the result of executing the intent, the execution module 144 may display the result of executing the intent by the communication apparatus or may directly execute the intent on the notification interaction apparatus 10 and display the result of the execution. Another embodiment is given below for detailed description.

Figure 3:
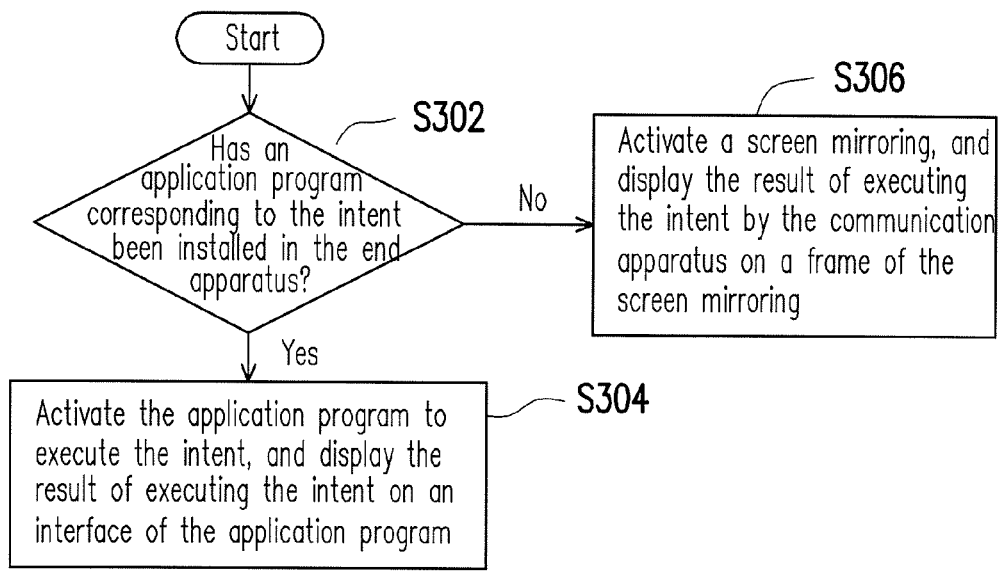
FIG. 3 is a flowchart illustrating a method of displaying a result of executing an intent according to an embodiment of the invention.

FIG. 3 is a flowchart illustrating a method of displaying a result of executing an intent according to an embodiment of the invention. Referring to FIG. 3, the method according to the present embodiment describes an implementation of step S212 in FIG. 2, but is not intended to limit the scope thereof.

When the execution module 144 determines to display the result of executing the intent on the display unit 12, the execution module 144 first inspects whether an application program corresponding to the intent has been installed in the notification interaction apparatus 10 (step S302). This application program may be, but is not limited to, an independent software, a customized UI or a plugin in an operating system or a browser.

If the execution module 144 determines that an application program corresponding to the intent has been installed in the notification interaction apparatus 10, an application program activation module (not illustrated) activates the application program to execute the intent, and displays the result of executing the intent on an interface of the application program (step S304). In detail, the execution module 144 triggers the communication apparatus to execute the intent when the user selects the notification; however, if a corresponding application program has been installed in the notification interaction apparatus 10, the intent may be directly executed by the application program and the result of the execution is displayed. For example, for a notification concerning an instant messaging, if a corresponding instant messaging software has been installed in the notification interaction apparatus 10, when the user clicks on the notification, the application program activation module activates the instant messaging software to display the content of the instant message so that the user may edit or reply to the message. For a notification concerning an e-mail, if an e-mail software has been installed in the notification interaction apparatus 10, when the user clicks on the notification, the application program activation module activates the e-mail software to display the content of the e-mail so that the user may edit or reply to the e-mail. Handling of other various types of notifications such as a calendar event, a reminder, a phone call or a social software can be inferred from the above embodiments, and details thereof are omitted herein.

On the other hand, if the execution module 144 determines that no application program corresponding to the intent is installed in the notification interaction apparatus 10, a screen mirroring module (not illustrated) activates a screen mirroring in the notification interaction apparatus 10, so that the result of executing the intent by the communication apparatus is displayed on a frame of the screen mirroring (step S306). In detail, even if there is no corresponding application program in the notification interaction apparatus 10 for executing the intent, the execution module 144 still triggers the communication apparatus to execute the intent. Accordingly, the effect of displaying the result of executing the intent of the present embodiment is achieved by acquiring from the communication apparatus a frame showing the result of executing the intent and displaying the same. The screen mirroring module, for example, acquires the frame showing the result of executing the intent by the communication apparatus through the communication unit 11, and displays the frame on the display unit 12, thereby informing the user of the result of the execution.

Figure 4:
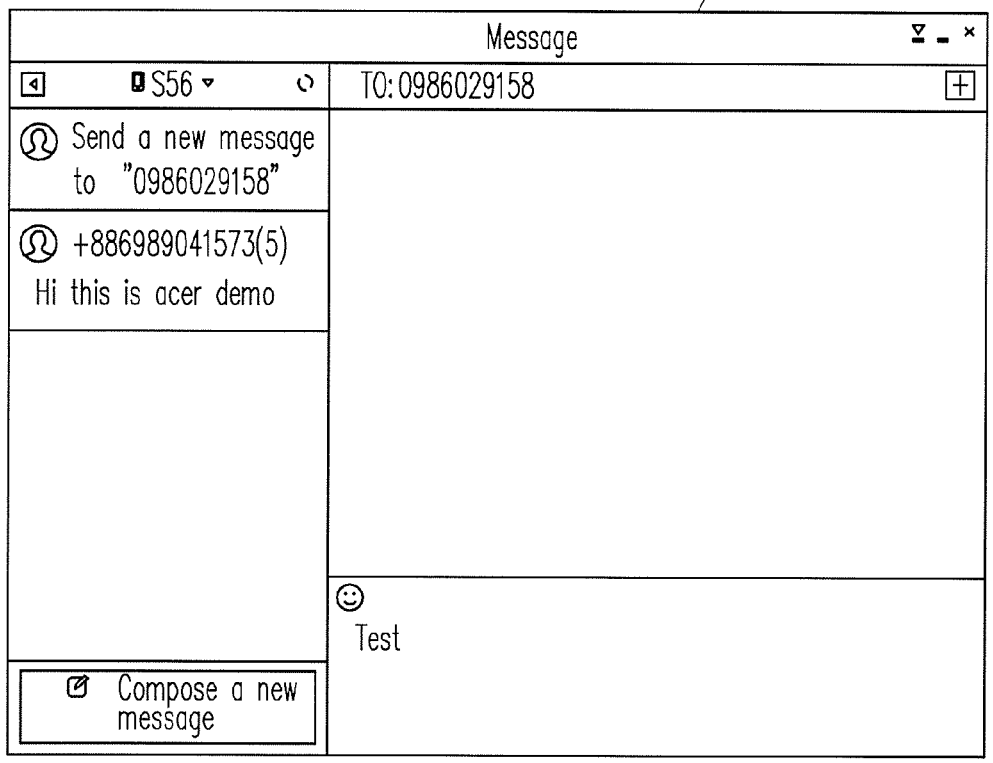
FIG. 4 illustrates an example of displaying the result of executing an intent according to an embodiment of the invention.
Figure 5:
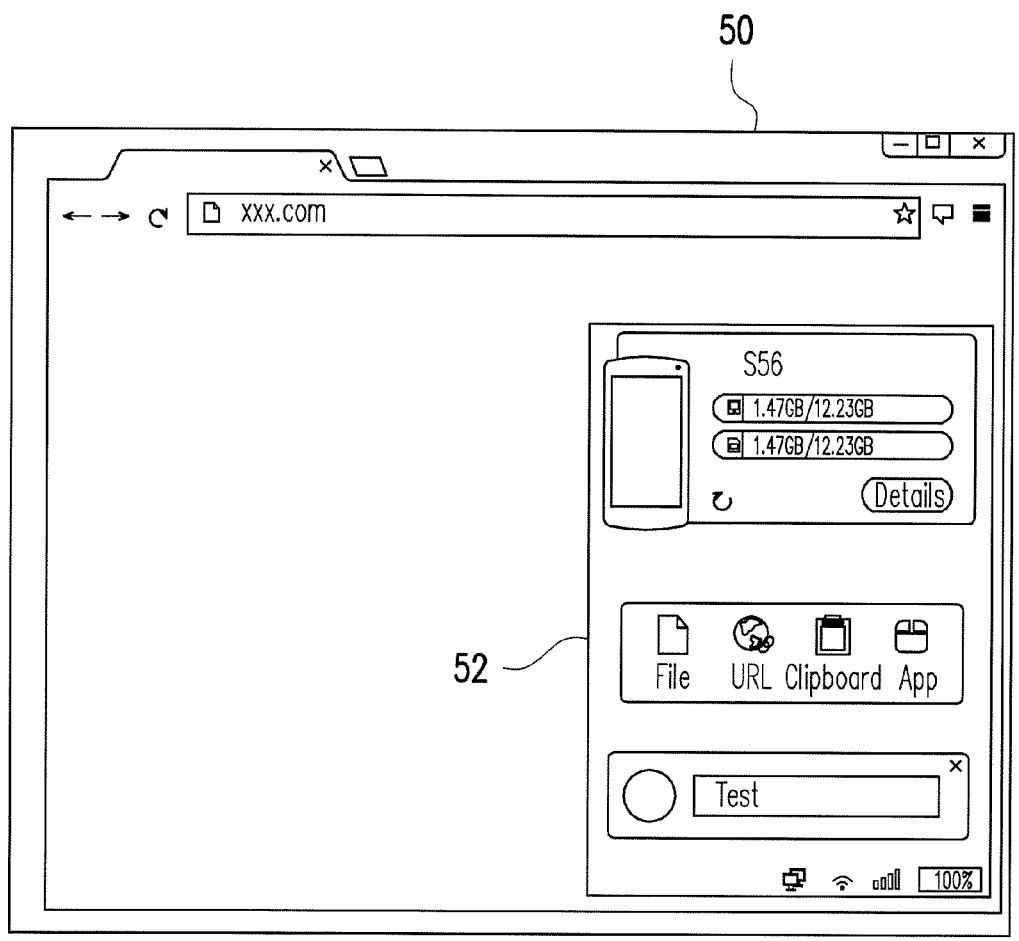
FIG. 5 illustrates an example of displaying the result of executing an intent according to an embodiment of the invention.

For example, FIG. 4 and FIG. 5 illustrate examples of displaying the result of executing an intent according to an embodiment of the invention. Referring first to FIG. 4, a message editing interface 40 according to the present embodiment is, for example, a customized UI of a message software in an end apparatus, and corresponds to a message notification. When the user clicks on the message notification that appears on the end apparatus, the end apparatus activates the message software to display the content of the message notification. Meanwhile, the message software also allows the user to compose a new message, or delete or edit a message using the message editing interface 40. The user's operation on the message editing interface 40 is transmitted to the communication apparatus, and the message in the communication apparatus is processed synchronously. On the other hand, referring to FIG. 5, in the present embodiment, a screen mirroring is activated in a browser 50 of the end apparatus, so that the result of executing the intent by the communication apparatus is displayed on a frame 52 of the screen mirroring, such as on the message interface at a lower portion of the frame 52. In this way, the user is informed of the actual result of processing of the message by the communication apparatus, and the user may further use the interface in the frame 52 to remotely control the communication apparatus to compose a new message, or to delete or edit a message.

It is noted that the notification displayed on the end apparatus not only provides basic prompting functions but also allows the user to further interact with the notification, such as reply or dismiss the notification. Another embodiment is hereinafter described in detail.

Figure 6:
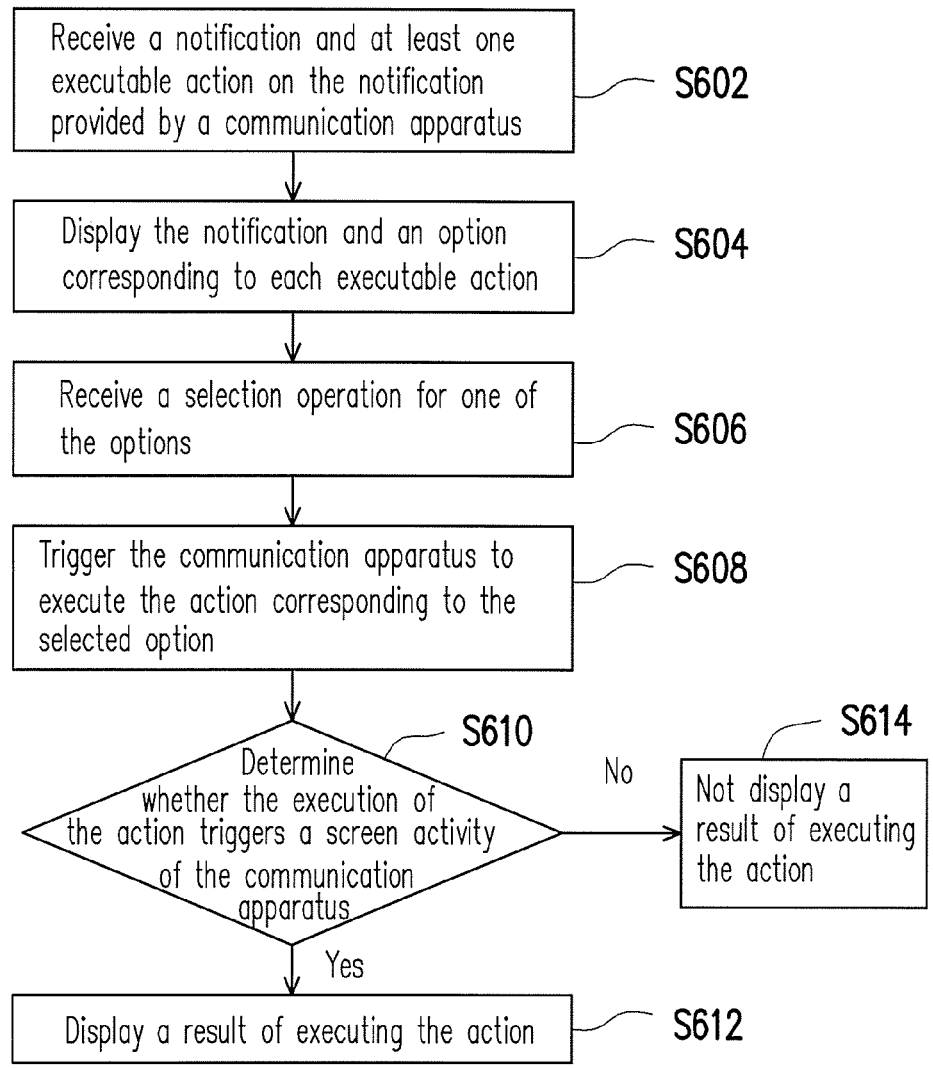
FIG. 6 is a flowchart illustrating a method for interacting with a notification according to an embodiment of the invention.

FIG. 6 is a flowchart illustrating a method for interacting with a notification according to an embodiment of the invention. Referring to FIG. 6, the method according to the present embodiment is adapted for the notification interaction apparatus 10 in FIG. 1. In the following, detailed steps of the method are explained with reference to the elements in the notification interaction apparatus 10.

First, the notification display module 141 receives a notification and at least one executable action on the notification provided by an external communication apparatus (not illustrated) through the communication unit 11 (step S602). The notification display module 141, for example, uses the communication unit 11 to receive the executable action on the notification provided by the communication apparatus. The action includes a quick action such as replying or dismissing the notification, setting priority of the notification, setting the notification as due or completed, or saving the notification to a specific folder. The quick action is, for example, set by an application program corresponding to each notification in advance for allowing the user to take upon seeing the notification. The type and number of the quick action are not limited by the present embodiment.

Then, the notification display module 141 displays the notification and an option corresponding to the executable action on the display unit 12 (step S604). The option may be displayed in the form of a screen button in a region of the notification, thus enabling the user to click thereon to execute the corresponding action.

When the input unit 13 receives a selection operation performed by the user for the option (step S606), the execution module 144 triggers the communication apparatus to execute the action corresponding to the selected option (step S608). At this moment, the activity determination module 143 further determines whether the execution of the action triggers a screen activity of the communication apparatus (step S610). If the activity determination module 143 determines that the execution of the action triggers the screen activity of the communication apparatus, the execution module 144 displays a result of executing the action on the display unit 12 (step S612). Otherwise, the execution module 144 does not display the result of executing the action on the display unit 12 (step S614). For example, if the selection operation of the user is to save the notification to a specific folder, the execution module 144, for example, displays a result of the saving operation on the display unit 12; if the selection operation of the user is to dismiss the notification, the execution module 144 does not display the result of the execution on the display unit 12.

By the above method, the present embodiment enables the user to interact with the notification of the communication apparatus through the end apparatus and obtain the result of the interaction in the simplest way.

In summary, in the method and the apparatus for interacting with a notification according to the invention, the notification of the communication apparatus is displayed on the end apparatus, and the user may accordingly execute an intent contained in the notification or an executable action on the notification. In the invention, only when the execution of the intent or the action triggers the screen activity of the communication apparatus, the result of executing the intent or the action is displayed on the end apparatus. Therefore, the user of the end apparatus is able to perform a quick interaction with the notification of the communication apparatus, and is prevented from receiving too many unwanted notifications.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A method for interacting with a notification, adapted for an end apparatus to interact with a notification provided by a communication apparatus, wherein the end apparatus and the communication apparatus are connected with each other, the method comprising:
   receiving and displaying the notification provided by the communication apparatus;
   receiving a selection operation for the notification;
   determining whether a content of the notification contains an executable intent;
   if the intent is contained, triggering the communication apparatus to execute the intent and determining whether the execution of the intent triggers a screen activity of the communication apparatus; and
   if the execution of the intent triggers the screen activity, displaying a result of executing the intent, wherein the method further comprising:
   receiving at least one action on the notification provided by the communication apparatus;
   displaying at least one option corresponding to the at least one action on the displayed notification;
   receiving the selection operation for one of the at least one option;
   triggering the communication apparatus to execute the action corresponding to the selected option, and determining whether the execution of the action triggers the screen activity of the communication apparatus; and
   if the execution of the action triggers the screen activity, displaying a result of executing the action.

2. The method according to claim 1, wherein the step of displaying the result of executing the intent comprises:
   determining whether an application program corresponding to the intent has been installed in the end apparatus;
   if the application program has been installed, activating the application program to execute the intent, and displaying the result of executing the intent on an interface of the application program; and
   if the application program has not been installed, activating a screen mirroring, so as to display the result of executing the intent by the communication apparatus on a frame of the screen mirroring.

3. The method according to claim 1, wherein the action comprises: replying to or dismissing the notification, setting priority of the notification, setting the notification as due or completed, or saving the notification to a specific folder.

4. An apparatus for interacting with a notification, comprising:
   a communication unit, connected to a communication apparatus;
   a display unit;
   an input unit, configured to receive an input operation;
   a storage unit, configured to store a plurality of modules; and
   a processing unit, coupled to the communication unit, the display unit, the input unit and the storage unit, and configured to access and execute the modules stored in the storage unit, wherein the modules comprise:
   a notification display module, configured to receive the notification provided by the communication apparatus through the communication unit, and displaying the notification on the display unit;
   an intent determination module, configured to determine whether a content of the notification contains an executable intent;
   an activity determination module, configured to determine whether an execution of the intent triggers a screen activity of the communication apparatus; and
   an execution module, configured to interact with the notification when the input unit receives a selection operation for the notification, wherein if the content of the notification contains the executable intent, the execution module triggers the communication apparatus to execute the intent, and if the execution of the intent triggers the screen activity, the execution module displays a result of executing the intent on the display unit, wherein
   the notification display module further receives at least one action on the notification provided by the communication apparatus through the communication unit and displays at least one option corresponding to the at least one action on the displayed notification;
   when the input unit receives the selection operation for one of the at least one option, the execution module further triggers the communication apparatus to execute the action corresponding to the selected option; and the activity determination module further determines whether the execution of the action triggers the screen activity of the communication apparatus, and if the execution of the action triggers the screen activity, the execution module displays a result of executing the action on the display unit.

5. The apparatus according to claim 4, wherein the modules further comprise:

an application program activation module, configured to activate an application program installed in the apparatus and corresponding to the intent so as to execute the intent, and displaying the result of executing the intent on an interface of the application program.

6. The apparatus according to claim 4, wherein the modules further comprise:

a screen mirroring module, configured to activate a screen mirroring, and displaying the result of executing the intent by the communication apparatus on a frame of the screen mirroring.

\* \* \* \* \*